United States Patent Office 3,332,962
Patented July 25, 1967

3,332,962
PHOSPHONIUM SALTS AND DERIVATIVES AND THEIR PREPARATION
Martin Grayson, Norwalk, Patricia Tarpey Keough, Ridgefield, and Michael M. Rauhut, Norwalk, Conn., assignors to American Cyanamid Company, Stamford, Conn., a corporation of Maine
No Drawing. Filed June 4, 1963, Ser. No. 285,224
8 Claims. (Cl. 260—332.3)

The present invention relates to organophosphorus compounds and to a method of preparing same. More particularly, the instant discovery concerns phosphonium salt derivatives of tertiary phosphines.

It has been found that tertiary phosphines generally will react with halo-substituted ethanol to produce the corresponding trialkyl-, tricycloalkyl-, or tri-aryl-2-hydroxyethylphosphonium salts. In turn, these salts may be acylated using a lower alkanoic anhydride, lower alkanoic acid, or the like, to produce their corresponding trialkyl-, tricycloalkyl-, or triaryl-2-acetoxyethylphosphonium salts.

The following equations illustrate this general reaction:

(A)
$$R^1R^2R^3P + XCH_2CH_2OH \longrightarrow R^1R^2R^3P^{\oplus}CH_2CH_2OH \cdot X^{\ominus}$$

(B)
$$R^1R^2R^3P^{\oplus}CH_2CH_2OH \cdot X^{\ominus} + \text{esterifying agent} \longrightarrow$$
$$R^1R^2R^3P^{\oplus}CH_2CH_2OY \cdot X^{\ominus}$$

$R^1$, $R^2$, $R^3$ each representing, as will be seen hereinafter, alkyl, cycloalkyl and aryl, X representing halogen or tetraphenyl borate, and Y representing the residue of an acylating or esterifying agent. The following is a typical embodiment of generic Equations A and B, above;

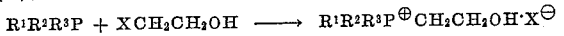

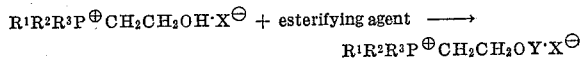

The trialkyl-, tricycloalkyl-, and triaryl-2-acetoxyethylphosphonium salts prepared as above may, in turn, be converted to their corresponding vinylphosphonium salts according to the following general equation:

(C)
$$R^1R^2R^3P^{\oplus}CH_2CH_2OY \cdot X^{\ominus} \xrightarrow{\text{base}} R^1R^2R^3P^{\oplus}CH=CH_2 \cdot X^{\ominus}$$

in which $R^1$, $R^2$, $R^3$, Y and X are the same as above.

The following is a typical embodiment of Equation C, above:

More specifically, in generic Equations A, B and C, above $R^1$, $R^2$ and $R^3$ each represent alkyl $C_1$–$C_{16}$, substituted alkyl $C_1$–$C_{16}$, cycloalkyl, and aryl; X represents halogen, such as bromo, chloro and iodo, and tetraphenyl borate; and Y in Equations B and C represents the residue of an acylating agent as shown in the specific embodiments, supra.

Typical tertiary phosphine reactants are the following:
trimethylphosphine,
triethylphosphine,
tripropylphosphine,
tributylphosphine,
tripentylphosphine,
trihexylphosphine,
triheptylphospine,
trioctylphosphine,
trinonylphosphine,
tridecylphosphine,
triundecylphosphine,
tridodecylphosphine,
tritridecylphosphine,
tritetradecylphosphine,
tripentadecylphosphine,
trihexadecylphosphine,
dodecyldiethylphosphine,
dioctylpropylphosphine,
diethylbutylphosphine,
butylethylhexylphosphine
tri(2-methoxypentyl)phosphine,
tris-2-cyanoethylphosphine,
diethyl-2-ethoxyheptylphosphine,
tricyclopropylphosphine,
tricyclohexylphosphine,
triphenylphosphine,
diphenylnaphthylphosphine,
trixylylphosphine,
tritolylphosphine,
tris(para-ethoxyphenyl)phosphine,
tris(para-chlorophenyl)phospine,
tris(2-chlorophenyl)phosphine,
tris(3-bromophenyl)phosphine, and the like.

Typical esterifying agents follow: lower alkanoic anhydrides, such as acetic anhydride, propionic anhydride, butanoic anhydride; lower alkanoic acids, such as formic acid, acetic acid, propionic acid, butanoic acid; acylating ($C_2$–$C_{18}$ alkanoyl) halides, such as acetyl chloride, propionyl bromide, butyryl iodide, octanoyl chloride, dodecanoyl bromide, stearyl chloride, hexanoyl bromide; isopropenyl acetate; aryl sulfonyl halides, such as para-toluenesulfonyl chloride, phenyl sulfonyl bromide, 2,4-dimethylphenylsulfonyl chloride; alkyl (lower) chloroformates, such as ethylchloroformate, butylchloroformate; alkyl (lower) carbonates, such as diethylcarbonate, dipropylcarbonate, dibutylcarbonate; ketene; dimethyl sulfate; nitrosyl chloride; and trimethyl phosphate.

In Equation C, above, typical suitable inorganic and organic bases are: alkali metal hydroxides, such as sodium hydroxide, potassium hydroxide, lithium hydroxide; alkali metal carbonates, such as sodium carbonate, potassium carbonate, lithium carbonate; alkaline earth metal hydroxides, such as magnesium hydroxide, barium hydroxide, calcium hydroxide; alkaline earth metal carbonates, such as magnesium carbonate, barium carbonate, calcium carbonate; activated alumina; and quaternary ammonium hydroxides, such as tetraalkyl (lower) ammonium hydroxides, including tetramethylammonium hydroxide, tetrapropylammonium hydroxide, and tetrabenzylammonium hydroxide; and basic ion exchange resins.[1]

The reaction in Equation A hereinabove is carried out at a temperature in the range of 30° C. to 250° C., preferably 60° C. to 180° C. The Equation B reaction, above, is best carried out at a temperature in the range of 5° C. to 150° C. As to Equation C, above, this reaction is generally carried out at a temperature in the range of 20° C. to 180° C., preferably 50° C. to 150° C.

Each of these three reactions may be carried out at atmospheric, sub-atmospheric or super-atmospheric pressure; preferably, however, reaction is carried out at atmospheric pressure. By the same token, the ratio of the reactants in each of Equations A, B and C is not critical, an excess of either reactant, in each equation, with respect to the other being suitable. In Equation B, however, an excess of about 10% by weight of the acylating agent relative to the phosphonium salt reactant is preferred. Generally in Equations A and C stoichiometric amounts of the reactants are employed.

---
[1] Typical are: polymeric quaternary ammonium salts, e.g., polymeric trimethylbenzyl ammonium chloride, etc.

The reactions of Equation A, above, are best carried out in the presence of an inert organic solvent, i.e., a solvent which does not enter into or otherwise interfere with the reaction under the conditions contemplated herein. Typical solvents are dimethoxyethane, dioxane, ethylacetate, tetrahydrofuran, and the like.

The reactions of Equation B similarly are best carried out in the presence of an inert organic solvent of the type described for Equation A, as well as acetic acid, dimethylformamide, diglyme, and the like.

As to Equation C, typical suitable inert organic solvents in which the phosphonium salt is solvent, which solvents do not interfere or enter into reaction to any substantial degree, are dimethoxyethane, dioxane, dimethylformamide, diglyme, acetonitrile, ethylacetate, tetrahydrofuran, and other like linear and cyclic ethers, acetate esters (lower alkyl).

Alternatively, it has been found pursuant to the instant discovery that the products of Equation A, above, may be converted directly to the products of Equation C, thusly, (D) $R^1R^2R^3P^{\oplus}CH_2CH_2OH°X^{\ominus} \rightarrow$
 $R^1R^2R^3P^{\oplus}CH=CH_2°X^{\ominus}$ in the presence of any base given above for Equation C and at a temperature in the range of 100° C. to 250° C. As in Equation C, a solvent of the type given hereinabove for Equation C is suitable and herein contemplated. If desired, the reaction may be carried out in the presence of a dehydrating agent, such as a siliceous agent including silica (e.g. silica gel), silica-alumina, and the like, in which other inert organic solvents are also suitable, e.g. aromatic hydrocarbons, such as toluene, benzene, xylene, cymene, and the like, methylene chloride, ethylene chloride, etc.

The products of Equations A, B, C and D above are useful as fire retardants in plastics, e.g., from 0.5 to 30 parts by weight of any one of above compounds when incorporated into 100 parts by weight of a thermoplastic polymer material, such as polyethylene, polypropylene, polystyrene, polyacrylate, polymethylmethacrylate, or the like, provides enhances fire retardance to the polymer material upon exposure to an open flame.

While the following examples specify certain details as to certain embodiments of the present invention, it is not intended that these details impose unnecessary limitations upon the scope of the instant discovery, excepting of course that these limitations appear in the appended claims:

*Example I.—Tributyl-2-hydroxyethylphosphonium tetraphenylborate*

Tributyl - 2 - hydroxyethylphosphonium bromide, obtained from combining tributylphosphine and 2-bromoethanol in 1,2-dimethoxyethane and refluxing under nitrogen, is dissolved in water and treated with excess 0.1 N sodium tetraphenylboron. The resulting precipitate is filtered and recrystallized from ethanol to yield product tributyl-2-hydroxyethylphosphonium tetraphenylborate with melting point 124° C.–125° C. Analysis of product (Found: C, 80.03; H, 9.00; P, 5.35. $C_{38}H_{52}O$ requires: C, 80.55; H, 9.25; P, 5.47%).

As is evident from this example, the halide salts of Equation A may be converted, in situ or after recovery thereof, to the corresponding tetraphenylborate salts.

*Example II.—Tributyl-2-acetoxyethylphosphonium bromide*

1,2-dimethoxyethane (275 milliliters), freshly distilled from calcium hydride, 2-bromoethanol (133 grams, 1.06 moles), and tributylphosphine (204 grams, 1.01 moles) are combined under nitrogen and refluxed at 85° C. overnight with stirring. A heavy oil forms within an hour. Isopropenyl acetate (320 grams, 3.2 moles) and 48% HBr (3 drops) are slowly added to the reaction mixture which is then refluxed 18 hours. Volatile components are removed in vacuo at 70° C. Product (372.5 grams; 99.9% yield) remains as a thick hygroscopic oil, which could be forced to crystallize by stirring in a benzene-petroleum ether (boiling point 30° C.–60° C.) mixture. Crystalline tributyl-2-acetoxyethylphosphonium salt is obtained from part of the oily product by freeze drying a benzene solution of the oil.

*Example III.—Tributyl-2-acetoxyethylphosphonium tetraphenylborate*

Tributyl-2-acetoxyethylphosphonium bromide oil (16.2 grams produced as in Example II, above) is dissolved in water and treated with sodium tetraphenylboron (15 grams) dissolved in water. A white precipitate appears which is filtered and recrystallized from ethanol containing enough acetonitrile to cause solution at the boiling point of the mixture. Tributyl-2-acetoxyethylphosphonium tetraphenylborate (16.7 grams) is obtained with melting point of 177° C.–179° C. Analysis of product (Found: C, 76.65; H, 8.83; P, 5.24. $C_{40}H_{54}O_2BP$ requires: C, 78.93; H, 8.94; P, 5.10%).

*Example IV.—Triphenyl-2-acetoxyethylphosphonium iodide*

2-iodoethyl acetate is prepared from the nucleophilic exchange reaction of sodium iodide and 2-chloroethylacetate in refluxing acetone under nitrogen (boiling point 86° C.–90° C. at 33 milliliters mercury). Triphenylphosphine (7.35 grams) is reacted with 2-iodoethylacetate) 24 grams) under nitrogen with stirring at 80° C. for 4.5 hours. The excess 2-iodoethylacetate is distilled off in vacuo. Crude, brown crystalline product (14.20 grams) is obtained by washing oily residue with ether. It is washed with ether, ethylacetate, and acetone and recrystallized from acetonitrile to give product (7.90 grams) with melting point 161° C.–163° C. Analysis of product (Found: C, 55.16; H, 4.80; I, 26.77; P, 6.45. $C_{22}H_{22}O_2IP$ requires: C, 55.47; H, 4.66; I, 26.66; P, 6.51%.)

Example IV represents still another embodiment of the present invention wherein the product salts of Equation B, above, are prepared directly from the reaction of a 2-haloethyl acetate with a tertiary phosphine of the type contemplated herein.

The process of Example IV, above, may be carried out using any of the tertiary phosphine reactants contemplated herein and the corresponding tri-substituted-2-acetoxyethylphosphonium halide produced and recovered, according to the following equation (E) 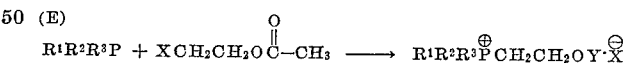

wherein $R^1$, $R^2$, $R^3$, X and Y have the meanings given hereinabove in Equations A and B.

Equation E is best carried out at a temperature in the range of 5° C. to 150° C., preferably at the reflux temperature of the solvent employed. Typical inert organic solvents contemplated for Equation E are acetone, lower alkanol (ethanol, butanol), plus the solvents listed hereinabove for Equation C. The reaction under Equation E, as shown in Example IV, supra, is best carried out under inert conditions, such as under nitrogen. Other 2-haloethyl acetate reactants contemplated herein are 2-bromoethyl acetate and 2-chloroethyl acetate.

Tables A, B, C, D and E, which follow, correspond to Equations A, B, C, D and E, respectively. The examples in Table A and B are carried out essentially as in Examples I and II, respectively supra, excepting of course as shown in Tables A and B. The examples in Table C are carried out essentially as in Example LX, infra, excepting of course as shown in Table C. Likewise, the products of Table D are recovered essentially as in Example LX, infra. The examples in Table E are carried out essentially as in Example IV, supra, excepting of course as shown in Table E.

TABLE A $$R^1R^2R^3P + XCH_2CH_2OH \longrightarrow R^1R^2R^3\overset{\oplus}{P}CH_2CH_2OH\cdot\overset{\ominus}{X}$$

| Example No. | R¹ | R² | R³ | Moles R¹R²R³P | X | Moles XCH₂CH₂OH | Solvent | Milliliters of Solvent | Temp., °C. | Product |
|---|---|---|---|---|---|---|---|---|---|---|
| V | CH₃ | CH₃ | CH₃ | 1 | Br | 1.0 | DME¹ | 1,500 | 70 | 2-hydroxyethyltrimethylphosphonium bromide. |
| VI | n-C₄H₉ | n-C₄H₉ | n-C₄H₉ | 1 | Cl | 1.0 | DME | 1,500 | 83 | 2-hydroxyethyltributylphosphonium chloride. |
| VII | n-C₄H₉ | n-C₄H₉ | n-C₄H₉ | 1 | Cl | 1.2 | Dioxane | 1,200 | 101 | Do. |
| VIII | n-C₄H₉ | n-C₄H₉ | n-C₄H₉ | 1 | I | 1.2 | do | 2,000 | 101 | 2-hydroxyethyltributylphosphonium iodine. |
| IX | i-C₄H₉ | i-C₄H₉ | i-C₄H₉ | 1 | Cl | 0.9 | Ethyl Acetate | 1,800 | 50 | 2-hydroxyethyltriisobutylphosphonium chloride. |
| X | n-C₈H₁₇ | n-C₈H₁₇ | n-C₈H₁₇ | 1 | Cl | 1.1 | DME | 1,700 | 83 | 2-hydroxyethyltrioctylphosphonium chloride. |
| XI | n-C₁₂H₂₅ | n-C₁₂H₂₅ | n-C₁₂H₂₅ | 1 | Cl | 1.1 | DME | 1,700 | 83 | 2-hydroxyethyltridodecylphosphonium chloride. |
| XII | C₁₆H₃₃ | C₁₆H₃₃ | C₁₆H₃₃ | 1 | Cl | 1.3 | THF² | 1,600 | 30 | 2-hydroxyethyltrihexadecylphosphonium chloride. |
| XIII | C₂H₅ | C₂H₅ | C₂H₅ | 1 | Cl | 1.0 | Dioxane | 1,700 | 200 | 2-hydroxyethyltriethylphosphonium chloride. |
| XIV | C₄H₉ | C₂H₅ | C₆H₁₃ | 1 | Cl | 1.1 | Ethyl Acetate | 2,000 | 45 | 2-hydroxyethylbutylethylhexylphosphonium chloride. |
| XV | C₂H₅ | C₂H₅ | C₂H₅O—CH₂—CH₂ | 1 | Cl | 1.2 | Dioxane | 1,800 | 75 | 2-hydroxyethyldiethyl-2-ethoxyethylphosphonium chloride. |
| XVI | cyclohexyl | cyclohexyl | cyclohexyl | 1 | Br | 1.3 | DME | 1,600 | 60 | 2-hydroxyethyltricyclohexylphosphonium bromide. |
| XVII | cyclopentyl | cyclopentyl | cyclopentyl | 1 | Cl | 0.9 | DME | 2,000 | 80 | 2-hydroxyethyltricyclopentylphosphonium chloride. |
| XVIII | phenyl | phenyl | naphthyl | 1 | I | 1.1 | Dioxane | 1,500 | 90 | 2-hydroxyethyldiphenylnaphthylphosphonium iodide. |
| XIX | phenyl | phenyl | phenyl | 1 | I | 1.0 | Dioxane | 2,000 | 101 | 2-hydroxyethyltriphenylphosphonium iodide. |
| XX | p-Cl-C₆H₄ | p-Cl-C₆H₄ | p-Cl-C₆H₄ | 1 | Cl | 1.2 | Ethyl Acetate | 1,600 | 65 | 2-hydroxyethyltri(para-chlorophenyl)phosphonium chloride. |
| XXI | p-CH₃-C₆H₄ | p-CH₃-C₆H₄ | p-CH₃-C₆H₄ | 1 | Cl | 1.3 | DME | 1,700 | 83 | 2-hydroxyethyltri(para-tolyl)-phosphonium chloride. |

¹ DME = Dimethoxyethane.  ² THF = tetrahydrofuran.

TABLE B $$R^1R^2R^3\overset{\oplus}{P}CH_2CH_2OH\cdot\overset{\ominus}{X} + A \longrightarrow R^1R^2R^3\overset{\oplus}{P}CH_2CH_2OY\cdot\overset{\ominus}{X}$$

| Example No. | Product of Example No. | Moles R³PCH₂CH₂OH·X | A | Moles A | Solvent Milliliters (ml.) | Temp., °C. | Product |
|---|---|---|---|---|---|---|---|
| XXII | V | 1.0 | Isopropenyl Acetate | 3.2 | DME, 300 ml | 83 | 2-acetoxyethyltrimethyl phosphonium bromide. |
| XXIII | VI | 1.0 | Dimethyl Sulfate | 3.8 | Dioxane, 300 ml | 90 | 2-methylsulfatoethyltributylphosphonium chloride. |
| XXIV | VII | 0.8 | Acetic Anhydride | 1.0 | Acetic acid, 300 ml | 120 | 2-acetoxyethyltributyl phosphonium chloride. |
| XXV | VIII | 0.9 | Nitrosyl Chloride | 1.1 | Diglyme | 120 | 2-nitroethyltributyl phosphonium iodide. |
| XXVI | IX | 1.0 | Acetyl Chloride | 1.2 | DME, 500 ml | 30 | 2-acetoxyethyltriisobutylphosphonium chloride. |

TABLE B.—Continued

| Example No. | Product of Example No. | $\overset{\oplus}{R_3PCH_2CH_2OH \cdot \overset{\ominus}{X}}$ Moles | A | Moles A | Solvent Milliliters (ml) | Temp., °C. | Product |
|---|---|---|---|---|---|---|---|
| XXVII | XI | 1.0 | p-Toluenesulfonyl chloride. | 1.0 | DME, 200 ml | 60 | 2-(p-toluenesulfonyloxy)ethyltridodecylphosphonium chloride. |
| XXVIII | XIII | 1.0 | Trimethyl Phosphate. | 1.1 | Acetic acid, 500 ml. | 80 | 2-dimethylphosphatoethyltriethyl phosphonium chloride. |
| XXIX | XII | 1.0 | Propionic Acid | 2.4 | DMF¹ 300 ml | 10 | 2-propionyloxyethyltrihexadecyl-phosphonium chloride. |
| XXX | XIV | 1.0 | Butanoic Anhydride. | 1.0 | DMF, 1,000 ml | 30 | 2-butyryloxyethylbutylethylhexyl-phosphonium chloride. |
| XXXI | XV | 0.8 | Acetic Acid | 4.0 | None | 118 | 2-acetoxyethyldiethyl-2-ethoxyethyl-phosphonium chloride. |
| XXXII | XVI | 0.9 | Acetyl Chloride | 1.0 | DME 200 ml | 65 | 2-acetoxyethyltricyclohexylphosphonium bromide. |
| XXXIII | XVII | 1.0 | Hexanoyl Chloride | 1.9 | Dioxane, 150 ml | 25 | 2-hexanoyloxyethyltricyclopentyl-phosphonium chloride. |
| XXXIV | XIX | 1.0 | Acetic Anhydride | 6.0 | None | 100 | 2-acetoxyethyltriphenyl phosphonium iodide. |
| XXXV | XVIII | 1.1 | Stearyl Chloride | 3.3 | DME, 700 ml | 50 | 2-stearyloxyethyldiphenylnaphthyl-phosphonium iodide. |
| XXXVI | XX | 1.0 | Dodecanoyl Bromide. | 4.0 | DMF, 1,000 ml | 40 | 2-dodecanoyloxyethyltri-(parachlorophenyl)phosphonium chloride. |
| XXXVII | XXI | 1.0 | Phenylsulfonyl Bromide. | 1.0 | Dioxane, 600 ml | 65 | 2-(phenylsulfonyloxy)-ethyltri(paratolyl)phosphonium chloride. |
| XXXVIII | V | 1.0 | Ethylchloroformate | 2.0 | Diglyme, 300 ml | 40 | 2-(ethoxycarbonyloxy)-ethyltrimethyl phosphonium bromide. |
| XXXIX | VII | 0.9 | Dipropyl carbonate | 3.0 | DME, 250 ml | 100 | 2-(propoxycarbonyloxy)-ethyltributylphosphonium chloride. |
| XL | VII | 1.0 | Ketene | 1.0 | THF, 500 ml | 75 | 2-acetoxyethyltributyl phosphonium chloride. |

¹ DMF=dimethylformamide.

TABLE C

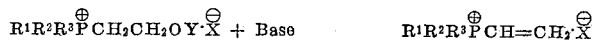

| Example No. | Product of Example No. | $\overset{+}{R^1R^2R^3PCH_2CH_2OY \cdot \overset{-}{X}}$ | Base | Moles of Base | Solvent¹ Milliliters (ml.) | Temp., °C. | Product |
|---|---|---|---|---|---|---|---|
| XLI | XXII | 1.0 | K₂CO₃ | 1.0 | DME, 300 ml | 83 | Vinyltrimethylphosphonium bromide. |
| XLII | XXIII | 1.0 | Na₂CO₃ | 2.0 | Dioxane, 300 ml | 100 | Vinyltributylphosphonium chloride. |
| XLIII | XXIV | 1.0 | Li₂CO₃ | 4.0 | Ethyl acetate, 500 ml. | 80 | Do. |
| XLIV | XXV | 2.0 | Mg(CO₃) | 8.0 | Diglyme | 100 | Vinyltributylphosphonium iodide. |
| XLV | XXVI | 0.5 | Ba(OH)₂ | 1.0 | Acetonitrile, 500 ml. | 80 | Vinyltriisobutylphosphonium chloride. |
| XLVI | XXVII | 0.9 | Ca(OH)₂ | 1.1 | THF, 600 ml | 60 | Vinyltridodecylphosphonium chloride. |
| XLVII | XXVIII | 1.0 | Polymeric trimethylbenzyl ammonium chloride. | 4.0 | DME, 400 ml | 85 | Vinyltriethylphosphonium chloride. |
| XLVIII | XXIX | 1.0 | KOH | 1.0 | THF | 150 | Vinyltrihexadecylphosphonium chloride. |
| XLIX | XXX | 1.0 | NaOH | 1.0 | Acetonitrile | 20 | Vinylbutylethylhexylphosphonium chloride. |
| L | XXXI | 1.0 | LiOH | 1.0 | do | 60 | Vinyldiethyl-2-ethoxyethylphosphonium chloride. |
| LI | XXXII | 1.0 | Mg(OH)₂ | 3.0 | THF | 72 | Vinyltricyclohexylphosphonium bromide. |
| LII | XXXIII | 2.0 | Ca(CO₃) | 1.0 | Dioxane | 180 | Vinyltricyclopentylphosphonium chloride. |
| LIII | XXXIV | 0.5 | Ba(CO₃) | 1.0 | DME | 81 | Vinyltriphenylphosphonium iodide. |
| LIV | XXXV | 3.0 | Polymeric triethylbenzyl ammonium hydroxide. | 1.0 | Dioxane | 97 | Vinylphenylnaphthylphosphonium iodide. |
| LV | XXXVI | 1.0 | do | 5.0 | DME | 50 | Vinyltri(para-chlorophenyl) phosphonium chloride. |
| LVI | XXXVII | 1.0 | Activated alumina. | 1.0 | THF | 35 | Vinyltri(para-tolyl)phosphonium chloride. |
| LVII | XXXVIII | 1.0 | Tetramethylammonium hydroxide. | 1.7 | Diglyme | 42 | Vinyltrimethylphosphonium bromide. |
| LVIII | XXXIX | 2.0 | Tetrapropylammonium hydroxide. | 1.0 | DMF | 37 | Vinyltributylphosphonium chloride. |
| LIX | XL | 1.0 | Tetrabenzylammonium hydroxide. | 1.0 | DME | 25 | Do. |

¹ When not specified the amount of solvent employed is 500 milliliters.

TABLE D $$R^1R^2R^3\overset{\oplus}{P}CH_2CH_2OH \cdot X^{\ominus} \xrightarrow{base} R^1R^2R^3\overset{\oplus}{P}CH=CH_2 \cdot \overset{\ominus}{X}$$

| Example No. | Product of Example No. | Base | Temp. °C. | Dehydrating Agent | 500 Milliliters of Solvent | Product |
|---|---|---|---|---|---|---|
| 1 | VI | Na₂CO₃ | 120 | Silica gel [1] | DME | Vinyltributylphosphonium chloride. |
| 2 | XI | Ca(OH)₂ | 100 | Silica-alumina [1] | DME | Vinyltridodecylphosphonium chloride. |
| 3 | XII | Li₂CO₃ | 220 | | THF | Vinyltrihexadecylphosphonium chloride. |
| 4 | XV | LiOH | 180 | Silica-alumina [1] | Dioxane | Vinyldiethyl-2-ethoxyethyl-phosphonium chloride. |
| 5 | XVI | Mg(OH)₂ | 150 | Silica gel [1] | DME | Vinyltricyclohexylphosphonium bromide. |
| 6 | XVIII | Na₂CO₃ | 250 | | Dioxane | Vinyldiphenylnaphthylphosphonium iodide. |
| 7 | XIX | BaCO₃ | 205 | | Dioxane | Vinyltriphenylphosphonium iodide. |
| 8 | XX | Na₂CO₃ | 200 | | DME | Vinyltri(para-chlorophenyl)-phosphonium chloride. |
| 9 | XXI | Activated alumina | 175 | | DME | Vinyltri(para-tolyl)phosphonium chloride. |

[1] Finely-divided particulates.

TABLE E $$R^1R^2R^3P + XCH_2CH_2O\overset{O}{\underset{\|}{C}}-CH_3$$

| Ex. No. | | Temp., °C. | Solvent | Product |
|---|---|---|---|---|
| 10 | Tridodecylphosphine, X=Br | Reflux | Ethanol | Tridodecyl-2-acetoxy-ethylphosphonium bromide. |
| 11 | Tricyclohexylphosphine, X=I | 85 | Acetonitrile | Tricyclohexyl-2-acetoxyethylphosphonium iodide. |
| 12 | Tris(2-chlorophenyl)-phosphine, X=Cl | Reflux | Acetone | Tris(2-chlorophenyl)-2-acetoxyethylphosphonium chloride. |
| 13 | Tris(2-methoxypentyl)-phosphine, X=I | 50 | Dioxane | 2-acetoxyethylphosphonium iodide. |

By finely-divided particulates in Table D is intended 28 to 200 mesh. Larger or smaller particulates are likewise within the purview of the instant discovery.

*Example LX.—Tributylvinylphosphonium bromide*

Tributyl - 2 - acetoxyethylphosphonium bromide (23.7 millimoles) is dissolved in 1,2-dimethoxyethane (25 milliliters) and sodium carbonate (5.0 grams, 47 millimoles) is added. The mixture is stirred at reflux under nitrogen for 8 hours. The solid is filtered off and washed with hot 1,2-dimethoxyethane. The combined filtrates are evaporated to leave a semi-solid residue. Recrystallization from ethyl acetate yields product tributylvinylphosphonium bromide (3.3 grams, 10.7 millimoles, 45% yield with melting point 148° C.–150° C.) Further recrystallization from ethylacetate-acetonitrile raises the melting point to 151.5° C. to 152.5° C.

The products of Equations and Tables B, C, D and E hereinabove may be reacted, pursuant to the present invention and according to the reaction conditions of Equation C, supra, with a polyhydric alcohol of the formula $$HO(R)OH$$

wherein R represents: alkylene $C_2$–$C_{12}$; cycloalkylene; R'OR" wherein R' and R" each represent lower alkyl

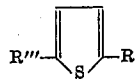

wherein R''' and R each represent lower alkyl and the residue of glucose, pentaerythritol, insitol, sorbitol, and mannitol. The product salt has the formula $$[(R^1R^2R^3PCH_2CH_2O)_2R]^{\oplus}X^{\ominus}$$

wherein $R^1$, $R^2$, $R^3$, and R and X have the meanings given hereinbefore.

The following examples illustrate this reaction, Examples LXII through LXXIV being carried out essentially as in Example LXI, excepting as shown in Table F:

*Example LXI.*—$[(C_4H_9)_3PCH_2CH_2OCH_2CH_2$
$OCH_2CH_2P(C_4H_9)_3]^{\oplus\oplus}2Br^{\ominus}$ Tributylvinylphosphonium bromide (30.8 grams, 0.10 mole) is mixed with 3.1 grams (0.05 mole) of ethylene glycol and five drops of 10% aqueous sodium hydroxide, and heated at 100° C.–130° C. for 8 hours. The resulting clear syrup represents a quantitative yield of 2,2-(ethylenedioxy)diethyl-bis(tributylphosphonium bromide). Treatment of this syrup with a one normal solution of sodium tetraphenyl boron yields a crystalline derivative, melting point 155° C.–156° C.

Analysis calculated for $C_{78}H_{106}P_2B_2O_2$: C, 80.81; H, 9.22; P, 5.54. Found: C, 80.83; H, 9.26; P, 5.06.

TABLE F

Reactants $$R^1R^2R^3PCH_2CH_2OY\cdot X^\ominus + HO(R)OH \xrightarrow{\text{base}}$$

$$R^1R^2R^3PCH=CH_2 \cdot X^\ominus + HO(R)OH \xrightarrow{\text{base}} [(R^1R^2R^3PCH_2CH_2O)_2R]^{\oplus\oplus}X^\ominus$$

Products

| Example No. | (1) Product of Example No. | Moles of (1) | (2) HO(R)OH | Moles of (2) | Base | Solvent | Temp., °C. | Products |
|---|---|---|---|---|---|---|---|---|
| LXII | XXII | 2.0 | HOCH$_2$CH$_2$CH$_2$OH | 1.0 | Ca(CO$_3$) | DME | 17 | [(CH$_3$)$_3$PCH$_2$CH$_2$OCH$_2$CH$_2$CH$_2$OCH$_2$CH$_2$P(CH$_3$)$_3$]$^{\oplus\oplus}$2Br$^\ominus$ |
| LXIII | XLI | 3.0 | HOCH$_2$(CH$_2$)$_5$CH$_2$OH | 1.0 | KOH | THF | 85 | [(CH$_3$)$_3$PCH$_2$CH$_2$OCH$_2$(CH$_2$)$_5$CH$_2$OCH$_2$CH$_2$P(CH$_3$)$_3$]$^{\oplus\oplus}$2Br$^\ominus$ |
| LXIV | XXIII | 2.5 | HOCH$_2$(CH$_2$)$_{10}$CH$_2$OH | 1.0 | (C$_2$H$_5$)$_4$NOH | Dioxane | 37 | [(C$_4$H$_9$)$_3$PCH$_2$CH$_2$OCH$_2$(CH$_2$)$_{10}$CH$_2$OCH$_2$CH$_2$P(C$_4$H$_9$)$_3$]$^{\oplus\oplus}$2Cl$^\ominus$ |
| LXV | XLVI | 4.0 | HOCH$_2$OCH$_2$OH | 1.0 | Mg(OH)$_2$ | DMF | 22 | [(C$_{12}$H$_{25}$)$_3$PCH$_2$CH$_2$OCH$_2$OCH$_2$CH$_2$P(C$_{12}$H$_{25}$)$_3$]$^{\oplus\oplus}$2Cl$^\ominus$ |
| LXVI | XXIX | 2.0 | HOCH$_2$(CH$_2$)$_3$OCH$_2$(CH$_2$)$_3$CH$_2$OH | 1.0 | (CH$_3$)$_3$N | THF | 28 | [C$_{16}$H$_{37}$)$_3$PCH$_2$CH$_2$OCH$_2$(CH$_2$)$_3$OCH$_2$(CH$_2$)$_3$CH$_2$O—CH$_2$CH$_2$P(C$_{16}$H$_{37}$)$_3$]$^{\oplus\oplus}$2Cl$^\ominus$ |
| XVII | XLIX | 2.0 | 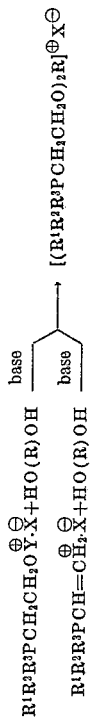 | 1.0 | Activated alumina | Diglyme | 10 | [(C$_2$H$_5$)(C$_4$H$_9$)(C$_4$H$_9$)PCH$_2$CH$_2$O—⟨◯⟩—OCH$_2$CH$_2$ P(C$_2$H$_5$)(C$_4$H$_9$)(C$_2$H$_5$)]$^{\oplus\oplus}$2Cl$^\ominus$ |
| LXVIII | XXXI | 3.5 | | 1.0 | NaOH | THF | 30 | [(C$_2$H$_5$)$_2$(CH$_2$CH$_3$)PCH$_2$CH$_2$O—⟨◯⟩—OCH$_2$CH$_2$P(CH$_2$CH$_3$) / OC$_2$H$_5$ / OC$_2$H$_5$ (C$_2$H$_5$)$_2$]$^{\oplus\oplus}$2Cl$^\ominus$ |

TABLE F.—Continued

| Example No. | (1) Product of Example No. | Moles of (1) | (2) HO(R)OH | Moles of (2) | Base | Solvent | Temp., °C. | Products |
|---|---|---|---|---|---|---|---|---|
| LXIX | LI | 3.0 | HOCH$_2$–[thiophene]–CH$_2$OH | 1.0 | (C$_4$H$_9$)$_4$NOH | THF | 90 | [(C$_6$H$_5$)$_3$PCH$_2$CH$_2$OCH$_2$–[thiophene]–CH$_2$OCH$_2$CH$_2$P(C$_6$H$_5$)$_3$]$^{2\oplus}$ 2Br$^{\ominus}$ |
| LXX | XXXIV | 3.0 | HOCH$_2$(CH$_2$)$_2$CH$_3$–[thiophene]–CH$_3$(CH$_2$)$_2$CH$_2$OH | 1.0 | Ba(OH)$_2$ | Dioxane | 140 | [(C$_6$H$_5$)$_3$PCH$_2$CH$_2$OCH$_2$(CH$_2$)$_2$CH$_3$–[thiophene]–CH$_3$(CH$_2$)$_2$CH$_2$OCH$_2$CH$_2$P(C$_6$H$_5$)$_3$]$^{2\oplus}$ 2I$^{\ominus}$ |
| LXXI | LIV | 5.0 | C(CH$_2$OH)$_4$ | 1.0 | (C$_6$H$_5$CH$_2$)$_4$NOH | DME | 110 | [(naphthyl)$_2$PCH$_2$CH$_2$OCH$_2$]$_4$C · 4I$^{\ominus}$ |
| LXXII | XXXVI | 1.0 | HOCH$_2$(CHOH)$_4$CH$_2$OH | 1.0 | NaOH | DMF | 65 | [(4-Cl-C$_6$H$_4$)$_2$PCH$_2$CH$_2$OCH$_2$(CHOH)$_4$CH$_2$OH]$^{\oplus}$ Cl$^{\ominus}$ |
| LXXIII | LVI | 1.0 | O=CH(CHOH)$_4$CH$_2$OH | 1.0 | (C$_2$H$_5$)$_3$N | DME | 71 | [(4-CH$_3$-C$_6$H$_4$)$_3$PCH$_2$CH$_2$OCH$_2$(CHOH)$_4$CH=O]$^{\oplus}$ Cl$^{\ominus}$ |
| LXXIV | XXXIII | 2.8 | HOCH$_2$(CH$_2$)$_3$CH$_2$OH | 1.0 | Li$_2$(CO$_3$) | Acetonitrile | 25 | [(cyclopentyl)$_3$PCH$_2$CH$_2$OCH$_2$(CH$_2$)$_3$CH$_2$OCH$_2$CH$_2$P(cyclopentyl)$_3$]$^{2\oplus}$ 2Cl$^{\ominus}$ |

As is evident from Table F, above, trialkyl(lower) amines are likewise useful as bases in these reactions, e.g., triethylamine and tributylamine, and the like. When using these amines from about 1.0 to about 5.0 percent by weight thereof, based upon the total weight of reactants (1) and (2), is generally employed.

The products of Examples LXI through LXXIV may be employed as fire retardants in the manner defined hereinabove for the phosphonium salts of Equations B through E.

In Table F 500 milliliters of solvent is used in the examples. As illustrated in Example LXI, hereinabove, an excess of the alcohol reactant may be used as the solvent if desired.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

We claim:

1. A compound of the formula $$[(R^1R^2R^3P\text{---}CH_2CH_2O)_2R]^\oplus \cdot X^\ominus$$

wherein $R^1$, $R^2$ and $R^3$ each represent a member selected from the group consisting of alkyl $C_1$–$C_{16}$, alkoxy-substituted alkyl $C_1$–$C_{16}$, cyclopropyl, cyclopentyl and cyclohexyl, R represents a member selected from the group consisting of alkylene $C_2$–$C_{12}$, cyclohexylene, R'OR'' wherein R' and R'' each represent lower alkyl,

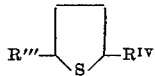

wherein R''' and R$^{IV}$ each represent lower alkyl, and X is halogen.

2. The compound $$[(CH_3)_3PCH_2CH_2OCH_2CH_2OCH_2CH_2P(CH_3)_3]^{\oplus\oplus}2Br^\ominus$$

3. The compound $$[(C_{12}H_{25})_3PCH_2CH_2OCH_2OCH_2OCH_2CH_2P(C_{12}H_{25})_3]^{\oplus\oplus}2Cl^\ominus$$

4. The compound

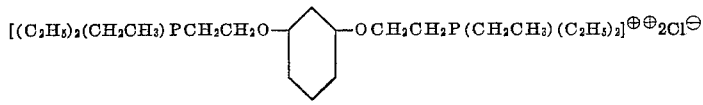

5. The compound

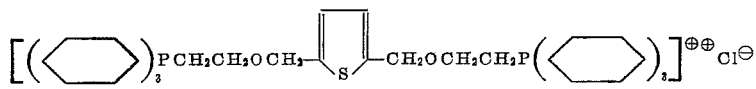

6. The compound

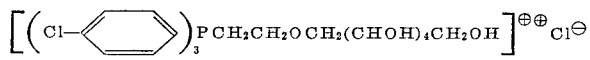

7. A method which comprises bringing into reactive contact a phosphonium salt selected from the group consisting of $$R^1R^2R^3PCH_2CH_2OY^\oplus \cdot X^\ominus$$
$$R^1R^2R^3PCH=CH_2^\oplus \cdot X^\ominus$$

and an alcohol of the formula $$HO(R)OH$$

in the presence of a base, and recovering the corresponding salt of the formula $$[(R^1R^2R^3PCH_2CH_2O)_2R]^\oplus X^\ominus$$

wherein $R^1$, $R^2$ and $R^3$ in the above formulae each represent a member selected from the group consisting of alkyl $C_1$–$C_{16}$, substituted alkyl $C_1$–$C_{16}$, cycloalkyl, phenyl, substituted phenyl, and naphthyl, said substituents for alkyl being lower alkoxy and said substituents for phenyl being lower alkyl or halogen;

Y is the residue of an esterifying agent;

X is halogen;

R is selected from the group consisting of alkylene $C_2$–$C_{12}$, cycloalkylene, R'OR'' in which R' and R'' each represent lower alkylene,

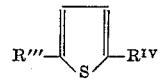

in which R''' and R$^{IV}$ each represent lower alkylene. and

R further represents the residue of a member selected from the group consisting of glucose, pentaerythritol, inositol, sorbitol, and mannitol.

8. The process of claim 7 in which reaction is made to take place in an inert organic solvent.

References Cited

UNITED STATES PATENTS 2,882,321  4/1959  Dornfeld _____ 260—606.5

WALTER A. MODANCE, *Primary Examiner.*

JAMES A. PATTEN, *Assistant Examiner.*